US005794146A

United States Patent [19]
Sevcik et al.

[11] Patent Number: 5,794,146
[45] Date of Patent: Aug. 11, 1998

[54] SYSTEM AND METHOD FOR CONSERVING BATTERY POWER IN A MOBILE STATION SEARCHING TO SELECT A SERVING CELL

[75] Inventors: Peter John Sevcik, Vancouver; Jeffrey Scott Vigil, Camas, both of Wash.

[73] Assignees: Sharp Microelectronics Technology, Inc., Camas, Wash.; Sharp Kabushiki Kaisha, Osaka, Japan

[21] Appl. No.: 696,457

[22] Filed: Aug. 14, 1996

[51] Int. Cl.[6] ........................................... H04Q 7/22
[52] U.S. Cl. .......................... 455/434; 455/515; 455/38.3; 455/161.1; 455/343
[58] Field of Search ................................ 455/434, 432, 455/435, 515, 343, 38.3, 161.1, 161.2, 161.3

[56] References Cited

U.S. PATENT DOCUMENTS

| 5,301,225 | 4/1994 | Suzuki et al. | 455/343 X |
| 5,507,039 | 4/1996 | Honma | 455/343 |
| 5,524,278 | 6/1996 | Williams et al. | 455/434 |
| 5,627,882 | 5/1997 | Chien et al. | 455/161.1 X |

OTHER PUBLICATIONS

Global System for Mobile Communications (GSM), Draft, pr ETS 300 578 , Mar. 1996, Sixth Edition, entitled Digital cCellular Telecommunications System (Phase 2); Radio Subsystem Link Control (GSM 05.08) published by European Telecommunications Standards Institute.

*Primary Examiner*—Reinhard J. Eisenzopf
*Assistant Examiner*—Philip J. Sobutka
*Attorney, Agent, or Firm*—Gerald W. Maliszewski; David C. Ripma

[57] ABSTRACT

A method is providing for a mobile station to vary the interval between scans by a mobile station for the beacon signals of cells in a communications system, in order to save battery power, when the mobile station is searching to select a serving cell. The method increases the interval between scans in response to the time elapsed since the start of the search. Initially, the scans are conducted with a small interval between the scans in the hope of quickly acquiring a serving cell. If a serving cell is not selected during this initial period of time, then the interval between scans is calculated to increase in response to the increase in elapsed time since the start of the search. If a serving cell is not selected during this period of calculated intervals, then the interval is set to a maximum limit to save battery power. A system for a mobile station to save power by varying the intervals between beacon signal scans when searching for a serving cell is also provided. The system and method provide a plurality of functions to calculate the scan intervals, and timing controls to vary when the calculated scan interval is to be applied in the search. In addition, the minimum and maximum scan intervals are variable is response to the likelihood of selecting a serving cell.

17 Claims, 5 Drawing Sheets

SYSTEM AND METHOD FOR CONSERVING BATTERY POWER IN A MOBILE STATION SEARCHING TO SELECT A SERVING CELL

BACKGROUND AND SUMMARY OF THE INVENTION

The present invention relates generally to cellular telephones, and more particularly to a system and method for conserving battery power in a mobile station when the mobile station is searching for a serving cell.

Cellular telephone systems divide a geographical region into adjoining sections called Public Land Mobile Networks (PLMNs). The boundaries of the sections are often determined by size, geographical features, population density, or national borders. The region of every PLMN is further subdivided into cells. Cells can be visualized as small, overlapping, geographical zones covering the region. These zones, or cells, are joined to completely blanket the PLMN. Each cell has an allocation of distinct frequencies for communications with the mobile station. The frequencies of adjoining cells are different to prevent radio interference between mobile station users in adjoining cells.

Mobile stations are usually handheld telephones used by pedestrians or by individuals traveling in automobiles. A mobile station can contact another mobile station, or a telephone that is part of a fixed telecommunication network with permanent user locations. The user of a mobile station contacts another user through communications with the cell. A mobile station is free to roam. That is, the mobile station is allowed to operate as it travels through a variety of geographical regions in the telephone system. To insure adequate communications, therefore, the mobile station will change cells, communicating with proximate cells as it moves.

When the user of a mobile station has a dedicated channel to communicate with other phone users, that is, engaged in a telephone conversation, decisions regarding the choice of cell to communicate through are made at the network level. However, when the mobile station does not have a dedicated channel, the mobile station has more authority in deciding which proximate cell to locate. The mobile station constantly monitors the power level of radio signals transmitted by proximate cells referred to herein as beacon signals. Based on the monitored power levels, and information received from the cell, the mobile station makes a decision as to which cell it is located in. By choosing a particular cell, the mobile station simultaneously selects the PLMN to which the cell belongs. A means of selecting a network search rate is disclosed in a co-pending application Ser. No. 08/630,130, filed Apr. 10, 1996, entitled "System and Method for Determining a Mobile Station Home Network Search Rate", invented by Bhaktha Keshavachar, Gerald Maliszewski, and Peter Sevcik.

The specific cell chosen by a mobile station for location in the serving PLMN is called the serving cell. To select a serving cell the mobile station monitors all of the beacon signal broadcasts of the communication system. Each cell has one assigned channel for a beacon signal. The P-Global System for Mobile Communications (GSM) system has 124 frequencies allocated for beacon signals, the E-GSM system has 174 frequencies for beacon signals, the Digital Cellular Systems (DCS)-1800 system has 374 beacon signal frequencies, and the Personal Communications System (PCS)-1900 system tentatively has 299 beacon signal frequencies. The mobile station monitors the signal strength of the beacon signals and also extracts information from each signal. For a cell to be acceptable as a serving cell it must have a C1 value greater than zero. The C1 criteria is a combination of the received beacon signal strength, the transmit power of the mobile station, and the p1 and p2 parameters that are broadcast on the beacon signal channels. The p1 parameter adjusts the measurement of received signal strength of the beacon signal, and p2 adjusts the mobile station transmit power number used in the equation to calculate C1. Generally, the mobile station selects the cell with the largest value of C1 as long as the C1 value is greater than zero. In some situations the cells of a network are barred from selection by a mobile station subscribing to a different network, regardless of the C1 value.

GSM cellular phone systems are operated in accordance with a set of comprehensive specifications. Section 6.8 of GSM 5.08 requires a mobile station, that has lost communications with its serving cell, to rapidly regain normal service by measuring the signal strength of beacon signals across the GSM band of beacon frequencies. The quickest way to satisfy this requirement is for the mobile station to continually search the band of beacon frequencies. The search for a serving cell is defined herein as the repetition of scans for system beacon signals. A scan is defined herein as the attempt by a mobile station to monitor every beacon signal in the communications system. For example, in a P-GSM system a mobile station searches for 124 frequencies in one scan. The mobile station repeats the scanning process until a serving cell is selected.

Constantly repeating the scans for the beacon frequencies provides the mobile station with the best chance of rapidly reacquiring a service cell. However, minimizing the time interval between scans, or maximizing the scan rate, causes the highest power consumption. Most mobile stations are battery powered and have power limitations. A rapid scan rate for the set of beacon frequencies, therefore, depletes the battery. In fact, searching the beacon frequencies to select a serving cell is a major cause of battery depletion in most commercial mobile station products.

It would be advantageous if a mobile station conducted a beacon signal search to select a serving cell in such a manner as to conserve battery use. It would also be advantageous if the mobile station could still acquire a serving cell in a relatively rapid manner while conserving battery power.

It would be advantageous if a mobile station had the ability to conduct the scan of the complete set of beacon signals in the communications system in a rapid manner to provide current information, together with the ability to increase the interval of time between scans of the set of beacon signals, decreasing the scan rate, to conserve battery power.

It would be advantageous if a mobile station adjusted its beacon scan rate in accordance with the likelihood of reacquiring a serving cell. In this manner, a rapid scan rate can be used when the mobile station is likely to select a serving cell, and a slow scan rate can be used to save battery power when a serving cell is unlikely to be acquired.

It would also be advantageous if a mobile station had a rapid beacon scan rate to initially search to select a serving cell, and a slower rate after the mobile station has been unsuccessful in selecting a serving cell. Accordingly, in a wireless communication system servicing a geographical area and including a plurality of intercommunicating cells, with each cell having a beacon signal, the communication system also including a plurality of mobile stations to send and receive user information, each mobile station selecting a serving cell by scanning a predetermined set of beacon cells, a method is provided for conserving battery power in a mobile station when the mobile station is searching for a serving cell. The method comprises the steps of: changing the rate at which the scan of the set of beacon signals is repeated, such that the scan rate decreases over a period of time; and searching the set of beacon signals at the scan rate determined above, whereby the scan rate decreases when the search for a serving cell is unsuccessful.

In the preferred embodiment of the invention the method includes the further steps of: measuring an elapsed time when a serving cell is to be selected, creating a Search Time Interval; and changing the scan rate with respect to the Search Time Interval to create a Calculated Scan Rate, such that the Calculated Scan Rate decreases as the Search Time Interval increases.

It is also a feature of the invention that the mobile station provides a First, minimum, Time Interval and Second, maximum, Time Interval, as well as a First, maximum, Scan rate and Second, minimum, Scan Rate. The method includes the additional step of comparing time intervals to select a scan rate as follows: using the First Scan Rate when the Search Time Interval is less than the First Time Interval; using the Second Scan Rate when the Search Time Interval is greater than the Second Time Interval; and using the Calculated Scan Rate when the Search Time Interval is less than the Second Time Interval, and greater than the First Time Interval.

The present invention also includes a system for conserving battery power in a mobile station when the mobile station is searching for a serving cell. The system and method are of value because they allow a balance to be struck between two conflicting goals of the mobile station. The conflicting roles are reducing the load on the battery, and rapidly acquiring a serving cell. Upon startup, or after the mobile station's serving cell is lost, the mobile station begins a new search to acquire a serving cell. Initially, the search of the beacon signal is conducted at a rapid scan rate in the hopes of rapidly reacquiring a serving cell. After a period of time called the First Time Interval the scan rate begins to decrease. Finally, after a period of time, called the Second Time Interval, the mobile station searches for a serving cell at a minimum scan rate. In this manner, the mobile station is able to search for a serving cell in a manner that saves battery power by adjusting the scan rate in accordance with the likelihood of finding a serving cell.

DETAILED DESCRIPTION OF THE PREFERRED EMBODIMENT

Figure 1:
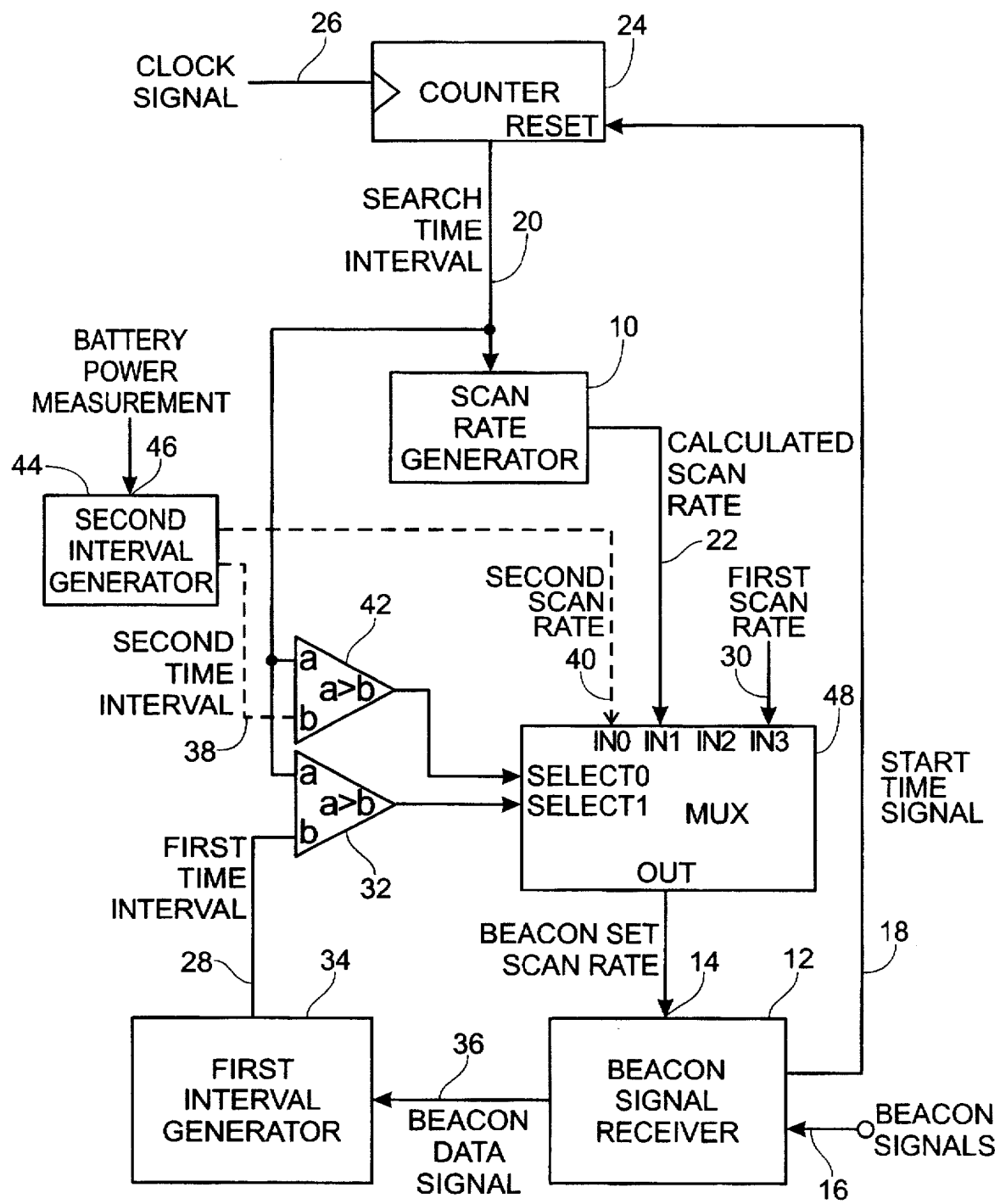
FIG. 1 is a schematic drawing illustrating the system of the present invention for conserving battery power in a mobile station when the mobile station is selecting a serving cell.

FIG. 1 is a schematic drawing illustrating the system of the present invention for conserving battery power in a mobile station when the mobile station is selecting a serving cell. A wireless communication system typically services a geographical area and includes a plurality of intercommunicating networks, usually each network is associated with a specific geographical area inside the communication system. The system typically includes a plurality of intercommunicating cells with each cell having a beacon signal. The communication system also includes a plurality of mobile stations to send and receive user information. As explained in the Background and Summary of the Invention section above, each mobile station selects a serving cell by scanning a predetermined set of beacon signals. The system comprises a scan rate generator 10 for changing the rate at which the scan of the set of beacon signals is repeated, such that the scan rate decreases over a period of time. Scan rate generator 10 has an output to supply the changing scan rate.

The system also comprises a beacon signal receiver 12 for searching the set of beacon signals at the scan rate determined by scan rate generator 10. Beacon signal receiver 12 has a first input operatively connected to the output of scan rate generator 10 to accept a Beacon Set Scan Rate, and a second input to accept beacon signals from the cells on a line 16.

The system described above operates so that the scan rate decreases when the results of the search are unsuccessful. The terms scan rate, beacon scan rate, and Beacon Set Scan Rate, as used herein, refer to the scan repetition rate of the set of beacon signals. That is, the scan rate concerns itself with the interval of time between scans of the complete set of beacon signals, as opposed to the interval of time between the search for individual frequencies inside one scan of the complete set of beacon signal frequencies.

Scan rate generator 10 can be implemented with a number of devices. For example, the decreasing scan rate can be supplied as the output of a pre-programmed look-up table stored in digital memory. The values of the look-up table are operatively connected to beacon signal receiver 12 as the Beacon Set Scan Rate on line 14. In this manner, the look-up data output commands beacon signal receiver 12 to scan at a progressively slower rate. Alternately, in an analog format, scan rate generator 10 can be a one-shot timer device outputting a RC (resistor/capacitor) time constant having a decreasing voltage in response to an input signal as is well known in the art. The decreasing voltage output is operatively connected to beacon signal receiver 12 as the Beacon Set Scan Rate on line 14. Beacon signal receiver 12 decreases the scan rate in response to the decreasing voltage.

Beacon signal receiver 12 monitors the beacon signals input on line 16. Typically beacon signal receiver 12 includes elements of the radio frequency (RF), intermediate frequency (IF), demodulation, and logic sections of the mobile station. As described herein, beacon signal receiver 12 is able to adjust the scan rate in response to the Beacon Set Scan Rate on line 14. Beacon signal receiver 12 is also able to measure the signal strength of beacon signals input on line 16, calculate the C1 criteria, select a serving cell based on C1 criteria and other information broadcast on the beacon signals, and determine when a serving cell has been lost so that a search for serving cell is started.

A serving cell is lost gradually when the C1 value of the serving cell slowly approaches zero, and no neighbor cells appear with better C1 values. This gradual kind of loss may occur as the mobile station drives out of the area covered by the communications system. Alternately, when a mobile station enters a tunnel or moves between buildings, the C1 value of cells seen by the mobile station may suddenly fall below zero.

The C1 criteria is calculated per the following formula:

$$C1 = A - B.$$

Where

A=received level average power–p1

B=p2–maximum mobile station RF transmit power.

p1 is a parameter broadcast on every beacon signal, and is sometimes labeled RXLEV_ACCESS_MIN. In some systems, p1 can be a value between –110 dBm and –48 dBm. p1 represents the receiver sensitivity of the cell receiver associated with the beacon signal. Therefore, when A is a positive value, it represents the receiver sensitivity margin of the cell receiver.

p2 is also broadcast on the beacon signal, and is sometimes labeled MX_TXPWR_MAX_CCH. p2 is the transmit power of the cell's transmitter. In some systems the p2 value varies between 13 and 43 dBm. The value B, therefore, represents the difference in maximum power between the cell transmitter and a mobile station transmitter. When C1 equals 0 the link between the mobile station and the cell is equally balanced. When the value of C1 is greater than 0 there exists a safety margin in the link to the cell, either in the receiver sensitivity of the cell represented by A, or in the RF power transmitted to the cell receiver represented by B.

In one preferred embodiment of the invention beacon signal receiver 12, in addition to searching for beacon signals, determines if a serving cell is selected in response to the cell's beacon signal. Beacon signal receiver 12 has an output to supply a Start Timer Signal on a line 18 to indicate the start of a search for a serving cell. Scan rate generator 10 calculates a scan rate which decreases as the elapse of time in a search for a serving cell increases. Scan rate generator 10 has an input to accept a Search Time Interval on a line 20, which is the elapse of time since the start of the search for a serving cell, and the output of scan rate generator 10 supplies the Calculated Scan Rate on a line 22.

The system further comprising a counter 24 to measure the elapse of time in response to a trigger signal, counter 24 having a first input to accept a clock signal on a line 26 for measuring time intervals, a second input to accept the Start Timer Signal on line 18 to trigger the start of the measurement, and an output on line 20 to supply the elapse of time, which is the Search Time Interval, whereby the Calculated Scan Rate is dependent the elapsed time since the start of the search for a serving cell. After being started by the Start Timer Signal on line 18, counter 24 counts the number of clock pulses on line 26. Since the clock signal rate is known, the number of clock pulses output as the Search Time Interval on line 20 can be converted into a measurement of time. Alternate methods exist for measuring the elapse of time from an input signal, as is well known in the art.

Upon startup, or when beacon signal receiver 12 loses its serving cell, the Start Timer Signal is sent on line 18. For beacon signal receiver 12 to accept a beacon signal, and therefore select the cell associated with the beacon signal as the serving cell, the beacon signal must not be barred and its C1 criteria must be greater than zero. A mobile station can be barred from selecting a cell for serving when the mobile station and cell belong to two different subscription networks. Often this bar can be overridden when the call is of an emergency nature.

In a preferred form of the invention the Search Time Interval output on line 20 is the interval of time that begins when the search to select a serving cell begins. Alternately, the Search Time Interval may be triggered with any other convenient time reference that allows a measurement of elapsed time.

In the preferred form of the invention a First Time Interval on line 28 is provided, where the First Time Interval establishes a minimum time interval, and a First Scan Rate on line 30 is provided, where the First Scan Rate is the maximum scan rate. The system further comprises a first comparator 32 to compare the First Time Interval on line 28 to the Search Time Interval on line 20. First comparator 32 has a first input to accept the Search Time Interval on line 20, a second input to accept the First Time Interval on line 28, and an output to supply a scan rate as follows:

supplying the Calculated Scan Rate on line 22 when the Search Time Interval on line 20 is greater than First Time Interval on line 28; and supplying the First Scan Rate on line 30 when the Search Time Interval on line 20 is less than the First Time Interval on line 28, whereby the maximum scan rate is initially used to search for a serving cell.

That is, the system initially provides a maximum scan rate when a search for a serving cell is to be conducted. The maximum scan rate, or First Scan Rate on line 30, is used in the attempt to rapidly acquire a serving cell. After a period of time represented by First Time Interval on line 28, the system assumes that the search for a serving cell is likely to be unsuccessful. In order to save battery power, the Calculated Scan Rate on line 22 is used after the Search Time Interval on line 20 exceeds the First Time Interval on line 28. The Calculated Scan Rate on line 22 then decreases as Search Time Interval 20 increases.

In a preferred embodiment of the invention the system further comprises a first interval generator 34 to store information concerning the quantity and signal strength of the beacon signals of neighboring cells supplied by the Beacon Data Signal on a line 36, creating a neighborhood record. First interval generator 34 retrieves the neighborhood record when a serving cell is to be selected, and increases the First Time Interval on line 28 in response to a large number of neighboring cells having high strength beacon signals. First interval generator 34 has an input to accept the Beacon Data Signal on line 36, and an output to supply the First Time Interval on line 28, whereby the maximum scan rate on line 30 is maintained for a longer period of time when the recorded neighboring beacon signals are numerous and strong.

It is a feature of the system that the neighborhood record of first interval generator 34 is updated at a selective interval to create a record of neighborhood updates, so that the results of neighborhood record updates are compared. First interval generator 34 increases the First Time Interval on line 28 when the updates show a consistent record of a large number of neighboring cells having high strength beacon signals, whereby the maximum scan rate on line 30 is maintained for a shorter period of time when the mobile station shows a continuing degradation in the strength of neighboring beacon signals.

In this manner, the length of time during which the First Scan Rate on line 30 determines the scan rate, is varied. First interval generator 34 acts to vary the First Time Interval on line 28, and so, vary the period of time that the scan rate is controlled by the First Scan Rate on line 30. First Interval Generator 34 increases the First Time Interval on line 28 when the recorded history of the neighboring beacon signals indicates a greater likelihood of quickly reacquiring a serving cell. For example, if the neighborhood record shows a consistent pattern of many neighboring cells having strong signals just before the serving cell is lost, it may be assumed that the mobile station has gone behind a building or has entered a tunnel. In this situation a serving cell should be relatively easy to reacquire, and first interval generator 34 lengthens the First Time Interval on line 28. On the other hand, when the neighborhood record shows a history of neighboring cells with diminishing strength beacon signals, it may be assumed that the mobile station is leaving the communication system and that it will be difficult to reacquire a serving cell. In this situation first interval generator 34 may shorten the First Time Interval on line 28.

First interval generator 34 is alternately used (not shown) to vary the First Scan Rate on line 30 in response to the Beacon Data Signal on line 36. That is, first interval generator 34 is used to increase the maximum scan rate in situations where the mobile station is likely to acquire a serving cell. The likelihood of acquisition is determined from the Beacon Data Signal on line 36.

It is a feature of the system that a Second Time Interval on a line 38 is provided, where the Second Time Interval establishes a maximum time interval, and a Second Scan Rate on a line 40 is provided, where the Second Scan Rate is the minimum scan rate. The system further comprises a second comparator 42 to compare the Second Time Interval on line 38 to the Search Time Interval on line 20. Second comparator 42 has a first input to accept the Search Time Interval on line 20, a second input to accept the Second Time Interval on line 38, and an output supplying a scan rate as follows:

supplying the Calculated Scan Rate on line 22 when the Search Time Interval on line 20 is less than the Second Time Interval on line 38; and supplying the Second Scan Rate on line 40 when the Search Time Interval on line 20 is greater than the Second Time Interval on line 40, whereby the scan rate is ultimately set to the minimum scan rate on line 40 to save battery power.

In the preferred embodiment of the invention, the mobile station initially searches at the First Scan Rate on line 30 until the First Time Interval on 28 is exceeded by the Search Time Interval on line 20. Then, the search is conducted at the ever decreasing Calculated Scan Rate on line 22, a rate related to the Search Time Interval on line 20. Finally, after a period of time represented by the Second Time Interval on line 38, the search is conducted at the Second Scan Rate on line 40 which is the minimum scan rate. At this point in the search it is assumed that the mobile station is unlikely to find a serving cell and a scan rate is set to a minimum to conserve battery power.

In one embodiment of the invention the system further comprises a second interval generator 44 to decrease the Second Time Interval on line 38 as the battery power decreases. Second interval generator 44 has an input to accept a measurement at the battery power on line 46, and an output to supply the Second Time Interval on line 38, whereby the mobile station switches to the minimum scan rate sooner when the battery power is low. That is, second interval generator 44 adjusts the Second Time Interval on line 38 in response to the battery voltage. In this manner, the point in time at which the scan rate switches is adjustable in response to the power remaining in the mobile station's battery.

In one embodiment of the invention the system comprises second interval generator 44 to decrease the Second Scan Rate on line 40 as the battery power decreases. Second interval generator 44 has an input to accept a measurement of battery power on line 46 and an output to supply Second Scan Rate on line 40, whereby the mobile station slows the Second Scan Rate on line 40 when the battery power is low. That is, second interval generator 44 varies the Second Scan Rate on line 40 in response to the battery power measurement on line 46.

A multiplexer (MUX) 48 acts as a switch to supply the Calculated Scan Rate on line 22, the First Scan Rate on line 30, or the Second Scan Rate on line 40 to beacon signal receiver 12 as the Beacon Set Scan Rate on line 14. MUX 48 is controlled by the outputs of first comparator 32 and second comparator 42 as is well known in the art. Alternately, MUX 48 can be an set on analog switches. Several other means exist of selecting between scan rates in response to a comparison of time measurements, as will occur to those skilled in the art.

Figure 2:
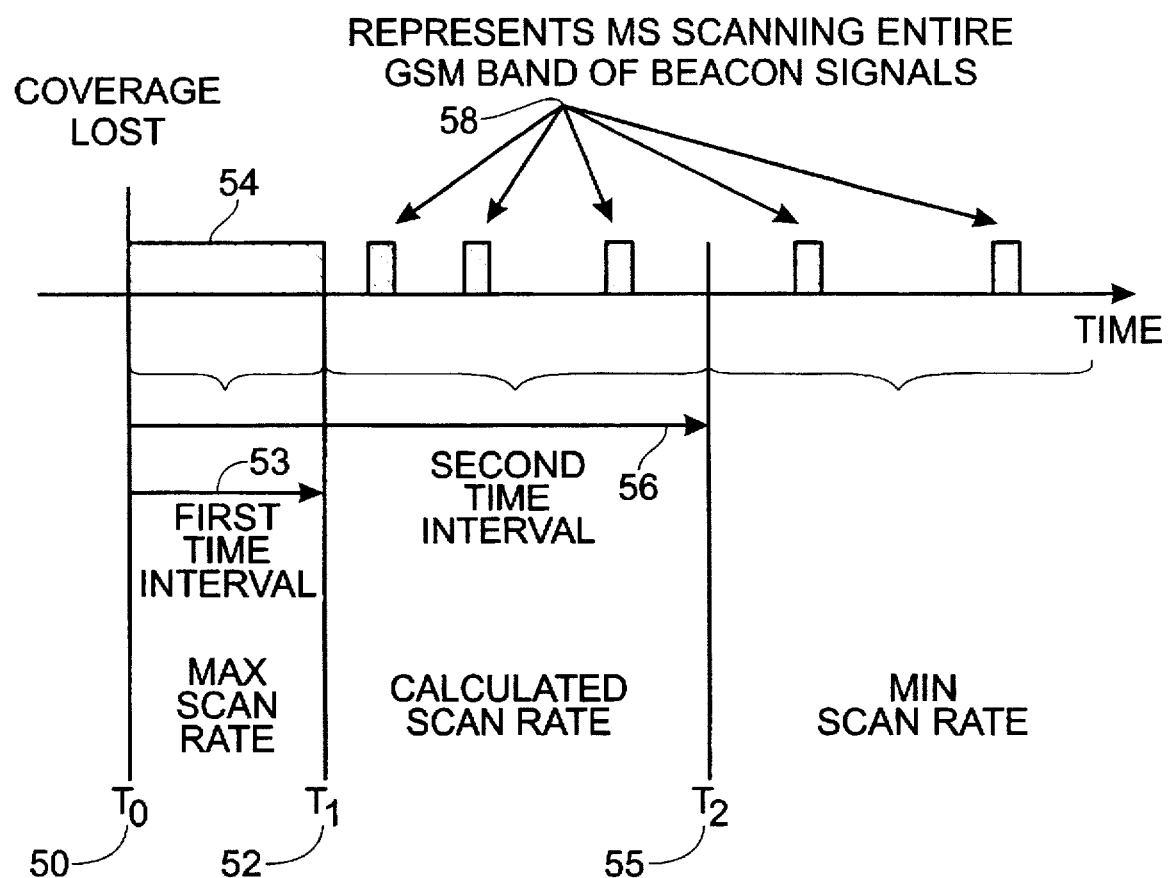
FIG. 2 illustrates the dynamic scan rate, versus time, of the present invention.

FIG. 2 illustrates the dynamic scan rate, versus time, of the present invention. At a time $T_0$ 50 coverage is lost. That is, the mobile station loses a previous serving cell and starts a search for a new serving cell. Alternately, the mobile station is being turned on. From time $T_0$ 50 to a time $T_1$ 52 is a First Time Interval 53, which is the First Time Interval on line 28 in FIG. 1. During First Time Interval 53 the mobile station searches for a serving cell at the maximum rate, which is the rate on line 30 in FIG. 1. In the example shown in FIG. 2, the mobile station's maximum rate is the fastest rate possible, as represented by the solid block on scans 54. That is, there are no periods of rest, or periods of non-scanning, between beacon signal scans. Alternately, the First Scan Rate can be at a slower scan rate so as to allow some interval of rest between scans.

From time $T_1$ 52 until a time $T_2$ 55 the mobile station uses the Calculated Scan Rate, which is the Calculated Scan Rate on line 22 of FIG. 1. That is, the mobile station uses the Calculated Scan Rate after the First Time Interval ends and before a Second Time Interval 56 ends. As can be seen in FIG. 2, the scan rate slows between $T_1$ 52 and $T_2$ 55. Each scan block 58 represents one scan, by the mobile station, for every beacon signal frequency in the communications system. Notice that the rest times between scans increases in the period of time between $T_1$ 52 and $T_2$ 55. In the preferred embodiment, the scan rate decreases in relation to the time elapsed since $T_0$ 50. After time $T_2$ 55 the mobile station switches to the minimum scan rate, which is the Second Scan Rate on line 40 in FIG. 1. The rest periods between scans is at its greatest based on the assumption that a serving cell is unlikely to be found. The large rest periods between scans conserves battery power.

Figure 3:
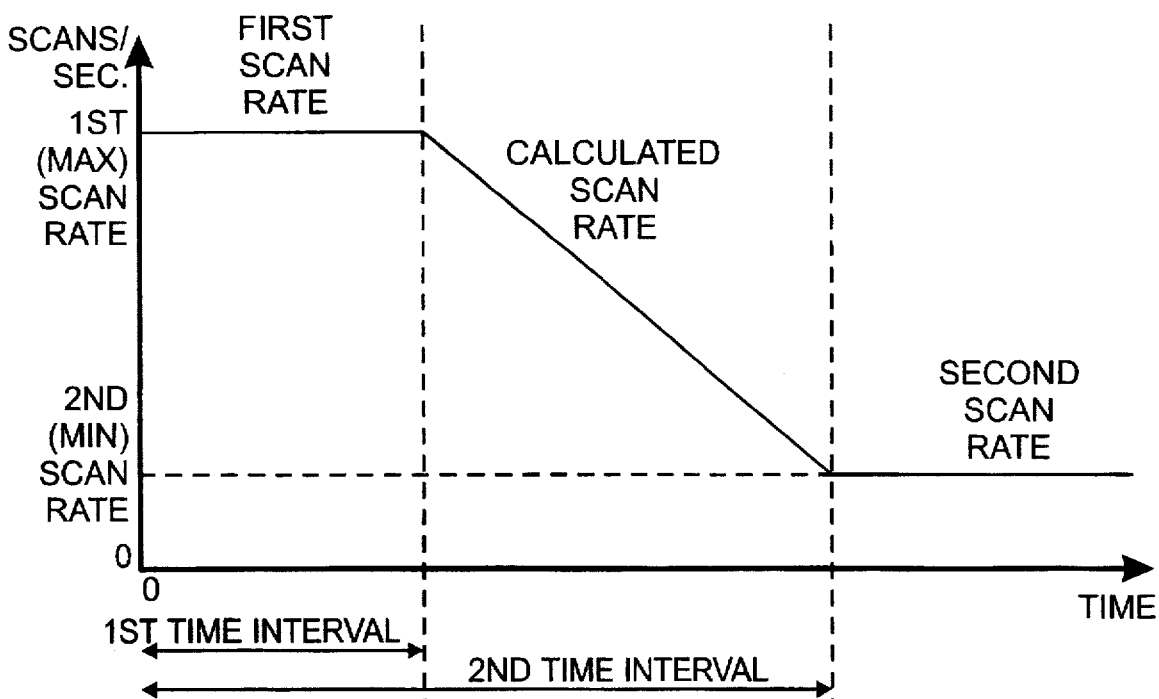
FIG. 3 illustrates the beacon scan rate calculated as a linear function with respect to the Search Time Interval.

FIG. 3 illustrates the beacon scan rate calculated as a linear function with respect to the Search Time Interval. Between the First Time Interval and the Second Time Interval, the Calculated Scan Rate changes proportionally to the time axis. Referring again to FIG. 1, it is a feature of the invention that the scan rate calculated by scan rate generator 10 is linear function with respect to Search Time Interval on line 20, whereby the Calculated Scan Rate on line 22 decreases uniformly as the Search Time Interval increases.

Figure 4:
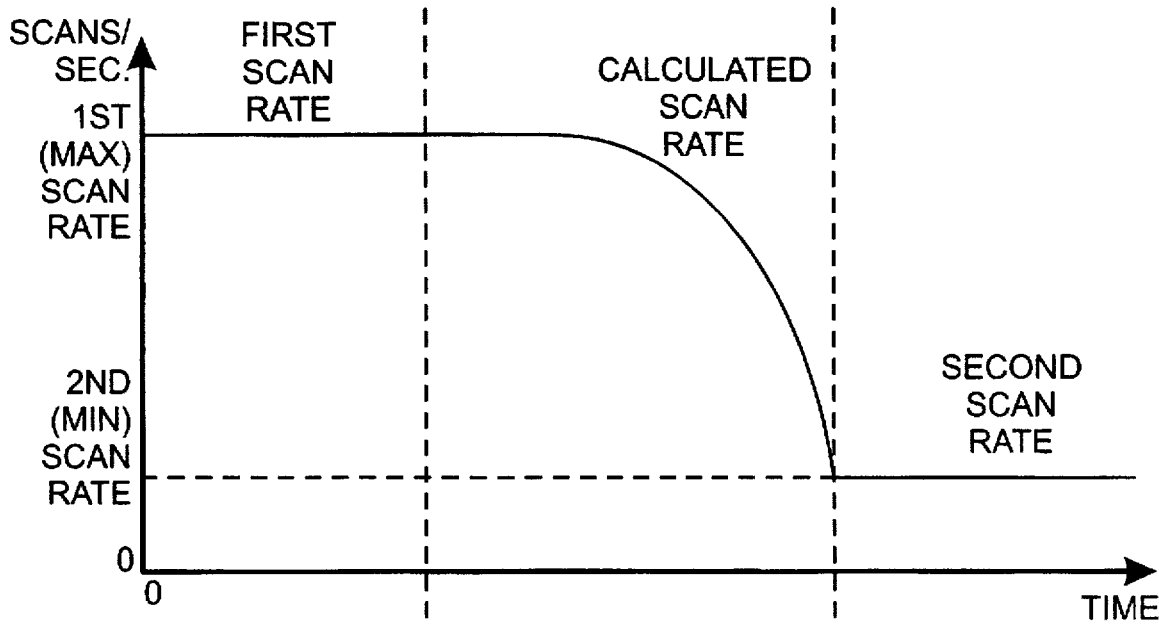
FIG. 4 illustrates the beacon scan rate calculated as an exponential function with respect to the Search Time Interval.

FIG. 4 illustrates the beacon scan rate calculated as an exponential function with respect to the Search Time Interval. Between the First Time Interval and the Second Time Interval, the Calculated Scan Rate changes in a nonlinear manner with respect to the time axis. Referring again to FIG. 1, it is a feature of the invention that the scan rate calculated by scan rate generator 10 is an exponential function with respect to Search Time Interval on line 20, whereby the Calculated Scan Rate decreases in a nonlinear manner as the search time increases.

Figure 5:
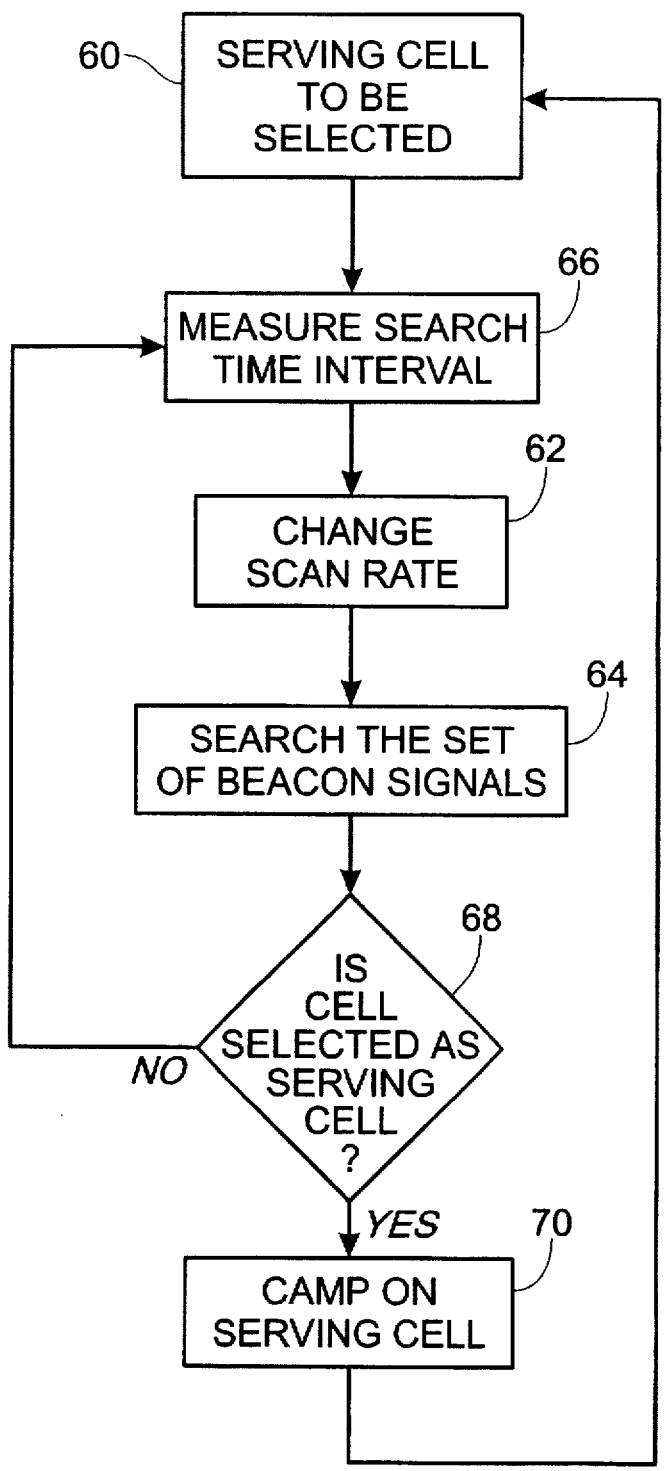
FIG. 5 if a flow chart diagram of the method of the present invention for conserving battery power in a mobile station when the mobile station is searching for a serving cell.

FIG. 5 is a flow chart diagram of the method of the present invention for conserving battery power in a mobile station when the mobile station is searching for a serving cell. As in FIG. 1, the mobile station operates in a wireless communications system servicing a geographical area and includes a plurality of intercommunicating cells, with each cell having a beacon signal. The communications system also includes a plurality of mobile stations to send and receive user information, each mobile station selecting a serving cell by scanning a predetermined set of beacon signals. Step 60 provides a mobile station searching for a serving cell. In one embodiment, the method flows from Step 60 to a Step 62. Step 62 changes the rate at which the scan of the set of beacon cells is repeated, such that the scan rate decreases over a period of time. The method then proceeds to a Step 64. Step 64 searches the set of beacon signals at the scan rate determined in Step 62, whereby the scan rate decreases when the search for a serving cell is unsuccessful.

It is a feature of the invention that the scan rate of Step 62 changes with respect to a Search Time Interval to create a Calculated Scan Rate, such that the Calculated Scan Rate decreases as the Search Time Interval increases. A Step 66, performed before Step 62, measures an elapsed time when a serving cell is to be selected, creating the Search Time Interval. A Step 68, performed after Step 64, determines if a cell is selected as a serving cell, and if the serving cell is not found, then the method returns to remeasure the Search Time Interval in Step 66, whereby the scan rate is changed, and the search to select a serving cell is repeated at a new rate. If a cell is to be selected as the serving cell, the process continues to a Step 70 where the mobile station maintains a relationship, or camps, on a serving cell.

The process of camping is complex and, for the most part, outside the scope of the present invention. Once the mobile station selects a serving cell it extracts yet more information from beacon signals. From this information the mobile station learns more about its environment of proximate cells. The mobile station then performs a more limited monitoring of beacon signals. It scans only the serving cell and the neighboring cells, which are the cells in close proximity to the serving cell. It is common for a mobile station to reselect a neighboring cell as the serving cell based upon C1 calculations, especially if the mobile station is in motion. The process of reselecting serving cells from a limited scan of neighboring cells is not the selection process required when the mobile loses its serving cell, which is the subject of the present invention. When the mobile station loses communication with the serving cell then the method illustrated in FIG. 5 proceeds to Step 60 where the search for a serving cell is again started.

Figure 6:
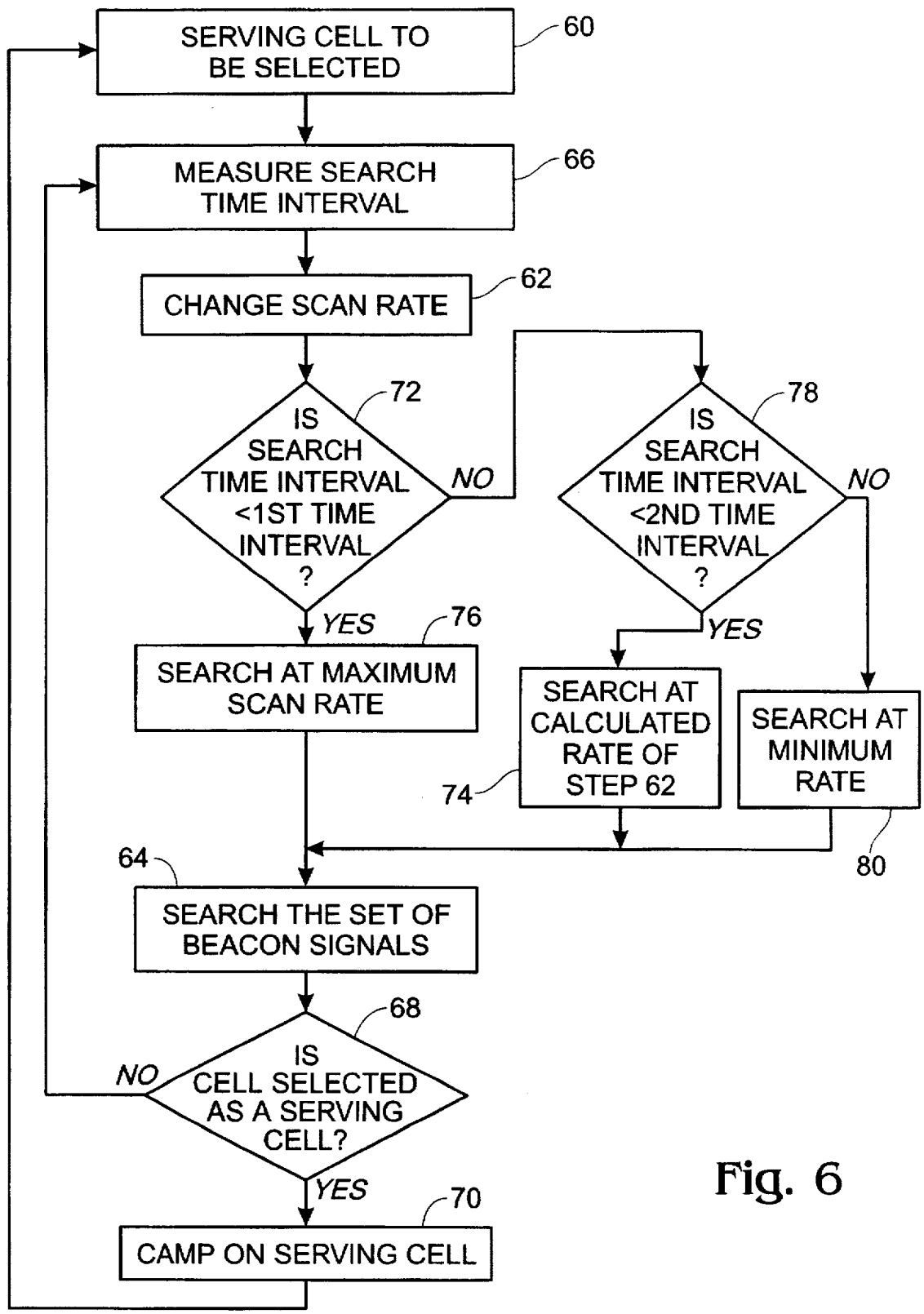
FIG. 6 is a more detailed flow diagram of the method of the present invention illustrated in FIG. 5.

FIG. 6 is a detailed flow chart diagram of the method of the present invention illustrated in FIG. 5. It is a feature of the invention that a First Time Interval is provided, where the First Time Interval is a minimum time interval, and a First Scan Rate is provided, where the First Scan Rate is the maximum scan rate. The search for beacon signals in Step 64 is responsive to an additional Step 72, performed before Step 64, of comparing of the Search Time Interval measured in Step 66 and the First Time Interval to select a scan rate as follows:

proceeding to a Step 74 to use the Calculated Scan Rate of Step 62 when the Search Time Interval is greater than the First Time Interval; and proceeding to Step 76 to use the First Scan Rate when the Search Time Interval is less than the First Time Interval, whereby the scan rate is initially repeated at the maximum rate.

One embodiment of the invention provides the Beacon Data Signal which includes information concerning beacon signals, and includes further steps, following Step 68, of:

storing information derived from the Beacon Data Signal concerning the quantity and signal strengths of the beacon signals of cells neighboring the selected cell, creating a neighborhood record;

retrieving the neighborhood record when a serving cell is to be selected; and increasing the First Time Interval used in Step 72 in response to a large number of neighboring cells having high strength beacon signals, whereby the maximum scan rate is maintained for a longer period of time when the recorded neighboring beacon signals are numerous and strong.

Further, the neighborhood record is updated at a selective interval to create a record of neighborhood updates and includes the further steps of:

comparing the results of neighborhood record updates; and increasing the First Time Interval used in Step 72 when the updates show a consistent record of a large number of neighboring cells having high strength beacon signals, whereby the maximum scan rate is maintained for a shorter period of time when the mobile station shows a continuing degradation of neighboring beacon signals.

It is a feature of the method that a Second Time Interval is provided, where the Second Time Interval establishes a maximum time interval, and a Second Scan Rate is provided, where the Second Scan Rate is the minimum scan rate. The search for beacon signals in Step 64 is responsive to an additional step, performed before Step 64, of comparing the Search Time Interval measured in Step 62 and the Second Time Interval as to select a scan rate follows:

proceeding to Step 74 to use the Calculated Scan Rate of Step 62 when the Search Time Interval is less than the Second Time Interval; and proceeding to a Step 80 to use the Second Scan Rate when the Search Time Interval is greater than the Second Time Interval, whereby the scan rate is ultimately repeated at the minimum rate to save battery power.

In one embodiment of the method battery power is measured, and the Second Time Interval used in Step 78 is a calculated value which decreases as the battery power decreases, whereby the mobile station switches to the minimum rate sooner when the battery power is low. Alternately, the battery power of the mobile station is measured, and the Second Scan Rate used in Step 80 is a calculated value which decreases as the battery power decreases, whereby the mobile station slows the Second Scan Rate when the battery power is low.

It is a feature of the invention that the scan rate calculated in Step 62 is an exponential function with respect to the Search Time Interval, whereby the Calculated Scan Rate decreases at a nonlinear rate as the search time increases. Alternately, the scan rate calculated in Step 62 is a linear function with respect to the Search Time Interval, whereby the Calculated Scan Rate decreases at a uniform rate as the Search Time Interval increases.

Table 1 is a software program written in the C language to implement a method for conserving battery power in a mobile station when the mobile station is searching for a serving cell. Likewise, the system depicted in FIG. 1 can be implemented using the software of Table 1 with a microprocessor and hardware to support the operation of a microprocessor in the mobile station. The first step of the program is to compare the elapsed TimeSinceLossOfComm with the First Time Interval. That is, a check is made of whether the Search Time Interval is less than the First Time Interval. If the Search Time Interval is less, then the scan rate is set to the maximum or First Scan Rate. The second step of the program is to check whether the elapsed TimeSinceLossOfComm (Search Time Interval) is between the First Time Interval and the Second Time Interval. If the Search Time Interval is greater than the First Time Interval and less than the Second Time Interval, then the Calculated Scan Rate is used.

The third step of the program checks whether the elapsed TimeSinceLossOfComm (Search Time Interval) is greater than the Second Time Interval. If the Search Time Interval is greater than the Second Time Interval, then the Second (minimum) Scan Rate is used to search for beacon signals. The three steps of the software program in Table 1 are equivalent to Steps 72 through 80 in FIG. 6. Alternately, the software of Table 1 performs the equivalent task as first comparator 32, second comparator 42, and MUX 48 of FIG. 1.

TABLE 1

```
/*
*******************************************************************************
*                                                                              *
*           Module Name: calculate_search_rate                                  *
*                                                                              *
*           Description: This function calculates the timeUntilNextSearch based on *
*                       elapsedTimeSinceLossOfComm by testing for three unique *
*                       situations.                                             *
*                                                                              *
*                       1) elaspedTimeSinceLossOfComm < FIRST_TIME_INTERVAL    *
*                       2) FIRST_TIME_INTERVAL <= elaspedTimeSinceLossOfComm < *
*                          SECOND_TIME_INTERVAL                                *
*                       3) SECOND_TIME_INTERVAL <= elaspedTimeSinceLossOfComm  *
*                                                                              *
*                       In the case of 1) and 3), a fixed value is assigned to *
*                       timeUntilNextSearch. In case 2), the value returned by *
*                       function f() is assigned to timeUntilNextSearch.       *
*                                                                              *
*           Originator: Peter J. Sevcik                                         *
*                                                                              *
*           Date: July 31, 1996                                                *
*                                                                              *
*                       Copyright 1996 Sharp Microelectronics Technology, Inc. *
*                       All Rights Reserved                                    *
*                                                                              *
*******************************************************************************
*/ time calculate_search_rate (time elaspedTimeSinceLossOfComm)
{
time timeUntilNextSearch;

if(elaspedTimeSinceLossOfComm < FIRST_TIME_INTERVAL)
    {
        timeUntilNextSearch = 1/(float)FIRST_SCAN_RATE;
    }
    else if(elaspedTimeSinceLossOfComm < SECOND_TIME_INTERVAL)
    {
        timeUntilNextSearch = f(elaspedTimeSinceLossOfComm);
    }
    else
    {
        timeUntilNextSearch = 1/(float) SECOND_SCAN_RATE;
    } return timeUntilNextSearch;
}
```

Table 2 is a software program written in the C language to implement the linear calculation of the Search Time Interval. To be most useful in an electrical device, the Calculated Scan Rate is inverted to provide the (interval of) TimeUntilNextSearch. The equation is presented below:

$$TNS = \frac{((ET - FTI)*(1/SSR - 1/FSR))}{(STI - FTI)} + 1/FSR$$

Where:
TNS=TimeUntilNextSearch
ET=elapsedTime (Search Time Interval)
FTI=First Time Interval
STI=Second Time Interval
SSR=Second Scan Rate
FSR=First Scan Rate When the Search Time Interval is equal to the First Time Interval, then the TimeUntilNextSearch is equal to the inverse of the First Scan Rate. The interval between scans is the minimum value. When the search time is equal to the Second Time Interval, then the TimeUntilNextSearch is equal to the inverse of the Second Scan Rate, or the maximum interval between scans. In between the First and Second Time Intervals the TimeUntilNextSearch changes proportionally (linearly) with respect to time.

TABLE 2

```
/*
****************************************************************************
*                                                                           *
*   Module Name:  f                                                         *
*                                                                           *
*   Description: This function uses linear interpolation to arrive at the   *
*                correct timeUntilNextSearch based on the elapsedTime since *
*                loss of signal.                                            *
*                                                                           *
*                Note: The definitions FIRST_SCAN_RATE and SECOND_SCAN_RATE *
*                      have units scans/second and must be converted to     *
*                      quantities having units seconds/scan. This is        *
*                      accomplished in the code by dividing the value one by*
*                      each of the quantities.                              *
*                                                                           *
*   Originator: Peter J. Sevcik                                             *
*                                                                           *
*   Date: July 31, 1996                                                     *
*                                                                           *
*          Copyright 1996 Sharp Microelectronics Technology, Inc.           *
*          All Rights Reserved                                              *
*                                                                           *
****************************************************************************
*/
time f(time elapsedTime)
{
time timeUntilNextSearch;

timeUntilNextSearch =
    ((elapsedTime - FIRST_TIME_INTERVAL) *
    (1/(float)SECOND_SCAN_RATE - 1/(float)FIRST_SCAN_RATE)/
    (SECOND_TIME_INTERVAL - FIRST_TIME_INTERVAL)) +
    1/(float)FIRST_SCAN_RATE;

return timeUntilNextSearch;
}
```

Table 3 is a software program written in the C language to implement the Calculated Scan Rate as an exponential function of the Search Time Interval. As in FIG. 2, the scan rates are converted to intervals between scans to interface with clocks, counters and timers of typical digital and analog devices. Since a decaying exponential curve only approaches zero, only a portion of the curve is used in the equation. The term EXPONENTIAL_TRUNC_VALUE specifies how much of the curve is used. The chosen portion of the curve is fitted into the equation so that when the curve reaches its proportional value when the region between the First and Second Time Interval is spanned. The equation is presented below:

$$(ETV * -(ET-FTI)/(STI-FTI))$$

$$TNS = e^{(ETV * -(ET-FTI)/(STI-FTI))} * (1/SSR - 1/FSR) + 1/FSR$$

Where:
TNS=TimeUntilNextSearch

ETV=EXPONENTIAL_TRUNC_VALUE

ET=elapsedTime (Search Time Interval)

FTI=First Time Interval

STI=Second Time Interval

FSR=First Scan Rate

SSR=Second Scan Rate

When the Search Time Interval equals the First Time Interval, then the TimeUntilNextSearch is equal to the inverse of the First Scan Rate. The interval between scans is a minimum value. When the Search Time Interval equals the Second Time Interval then the TimeUntilNextSearch equals the inverse of the Second Scan Rate, or the maximum interval between scans. In between the First Time Interval and the Second Time Interval the TimeUntilNextSearch varies exponentially with respect to time.

TABLE 3

```
/*
****************************************************************************
*                                                                           *
*   Module Name:  f                                                         *
*                                                                           *
*   Description: This function uses an expoential function to arrive at the *
*                correct timeUntilNextSearch based on the elapsedTime since *
*                loss of signal.                                            *
*                                                                           *
*                The EXPONENTIAL_TRUNC_VALUE is used to specify how much of *
*                the exponential curve is to be used,                       *
*                   i.e. e (-x) where x = 0 -> EXPONENTIAL_TRUNC_VALUE.     *
```

TABLE 3-continued

```
*                                                                        *
*        Note: The definitions FIRST_SCAN_RATE and SECOND_SCAN_RATE       *
*              have units scans/second and must be converted to          *
*              quantities having units seconds/scan. This is              *
*              accomplished in the code by dividing the value one by     *
*              each of the quantities.                                    *
*                                                                        *
*  Originator: Peter J. Sevcik                                            *
*                                                                        *
*  Date: July 31, 1996                                                    *
*                                                                        *
*        Copyright 1996 Sharp Microelectronics Technology, Inc.           *
*        All Rights Reserved                                              *
*                                                                        *
**************************************************************************
*/ time f(time elapsedTime)
{
time timeUntilNextSearch;

timeUntilNextSearch =
    (exp(EXPONENTIAL_TRUNC_VALUE *
    (-1.0 + (((float)elapsedTime - (float)FIRST_TIME_INTERVAL)/
        ((float)SECOND_TIME_INTERVAL - (float)FIRST_TIME_INTERVAL))
        )
    ) * (1/(float)SECOND_SCAN_RATE - 1/(float)FIRST_SCAN_RATE)) +
    1/(float)FIRST_SCAN_RATE;

return timeUntilNextSearch;
}
```

Using the present invention, a mobile station is able to both conserve power and rapidly acquire a serving cell. Initially, the search of the beacon signal is conducted at a rapid scan rate in the hopes of quickly reacquiring a serving cell. After a period of time called the First Time Interval the scan rate begins to decrease. Finally, after a period of time, called the Second Time Interval, the mobile station searches for a serving cell at a minimum scan rate. The mobile station is able to search for a serving cell in a manner that encourages rapid acquisition and power conservation. A method and system is provided to adjust the First Scan Rate, Second Scan Rate, First Time Interval, and Second Time Interval. In addition, the relationship between the Search Time Interval and the Calculated Scan Rate can be a variety of functions. Alternate embodiments of the above-described system and method of the present invention can be applied to a variety of cellular telephones or wireless communications, including GSM, PCS 1800, and PCS 1900. Other modifications and variations within the scope of the present invention will occur to those skilled in the art.

What is claimed is:

1. In a wireless communications system servicing a geographical area and including a plurality of intercommunicating cells, with each cell having a beacon signal, the communications system also including a plurality of mobile stations to send and receive user information, each mobile station selecting a serving cell by scanning a predetermined set of beacon signals, a method for conserving battery power in a mobile station when the mobile station is searching for a serving cell, wherein a First Time Interval is provided, where the First Time Interval establishes a minimum time interval, and a First Scan Rate is provided, where the First Scan Rate is the maximum scan rate, the method comprising the steps of:

$a_1$) measuring an elapsed time when a serving cell is to be selected, creating a Search Time Interval;

$a_2$) changing the rate at which the scan of the set of beacon signals is repeated, such that the scan rate decreases over a period of time, the scan rate changing with respect to the Search Time Interval to create a Calculated Scan Rate, such that the Calculated Scan Rate decreases as the Search Time Interval increases;

$a_3$) comparing the Search Time Interval measured in step $a_1$) and the First Time Interval to select a scan rate as follows:
 i) using the Calculated Scan Rate when the Search Time Interval is greater than the First Time Interval; and
 ii) using the First Scan Rate when the Search Time Interval is less than the First Time Interval, whereby the scan rate is initially repeated at the maximum rate;

b) searching the set of beacon signals at the scan rate determined in step $a_3$), whereby the scan rate decreases when the search for a serving cell is unsuccessful;

d) determining if a cell is selected as a serving cell, and if a serving cell is not found, then remeasuring the Search Time Interval in step $a_1$), whereby the scan rate is changed, and the search to select a serving cell is repeated at the new rate;

e) storing information derived from the Beacon Data Signal concerning the quantity and signal strengths of the beacon signals of cells neighboring the selected cell, creating a neighborhood record;

f) retrieving the neighborhood record when a serving cell is to be selected; and g) increasing the First Time Interval in response to a large number of neighboring cells having high strength beacon signals, whereby the maximum scan rate is maintained for a longer period of time when the recorded neighboring beacon signals are numerous and strong.

2. The method as in claim 1 wherein the neighborhood record of step e) is updated at a selective interval to create a record of neighborhood updates, and step g) including the further steps of:

i) comparing the results of neighborhood record updates; and ii) increasing the First Time Interval when the updates show a consistent record of a large number of neighboring cells having high strength beacon signals, whereby the maximum scan rate is maintained for a shorter period of time when the mobile station shows a continuing degradation of neighboring beacon signals.

3. The method as in claim 1 wherein a Second Time Interval is provided, where the Second Time Interval establishes a maximum time interval, and a Second Scan Rate is provided, where the Second Scan Rate is the minimum scan rate, and the search for beacon signals in step b) is responsive to an additional step, performed before step b), of comparing the Search Time Interval measured in step $a_1$) and the Second Time Interval to select a scan rate as follows:

i) using the Calculated Scan Rate when the Search Time Interval is less than the Second Time Interval; and ii) using the Second Scan Rate when the Search Time Interval is greater than the Second Time Interval, whereby the scan rate is ultimately repeated at the minimum rate to save battery power.

4. The method as in claim 3 wherein the battery power is measured, and in which the Second Time Interval is a calculated value which decreases as the battery power decreases, whereby the mobile station switches to the minimum scan rate sooner when the battery power is low.

5. The method as in claim 3 wherein the battery power of the mobile station is measured, and in which the Second Scan Rate is a calculated value which decreases as the battery power decreases, whereby the mobile station slows the Second Scan Rate when the battery power is low.

6. In a wireless communications system servicing a geographical area and including a plurality of intercommunicating cells, with each cell having a beacon signal, the communications system also including a plurality of mobile stations to send and receive user information, each mobile station selecting a serving cell by scanning a predetermined set of beacon signals, the system for conserving battery power in a mobile station when the mobile station is searching for a serving cell, the system comprising;

a scan rate generator for changing the rate at which the scan of the set of beacon signals is repeated, such that the scan rate decreases over a period of time, said scan rate generator calculating a scan rate which decreases as the elapse of time in a search for a serving cell increases, said scan rate generator having an output to supply the Calculated Scan Rate and an input to accept a Search Time Interval, which is the elapse of time since the start of the search for a serving cell;

a beacon signal receiver for searching the set of beacon signals at the scan rate determined by said scan rate generator, said beacon signal receiver having a first input operatively connected to the output of said scan rate generator to accept a Beacon Set Scan Rate, and a second input to accept beacon signals from the cells, said beacon signal receiver determining if a serving cell is selected in response to the cell's beacon signal, said beacon signal receiver having an output to supply a Start Timer Signal to indicate the start of a search for a serving cell, whereby the scan rate decreases when the results of the search are unsuccessful; and a counter to measure the elapse of time in response to a trigger signal, said counter having a first input to accept a clock signal for measuring time intervals, a second input to accept the Start Timer Signal to trigger the start of the measurement, and an output to supply the elapse of time, which is the Search Time Interval, whereby the Calculated Scan Rate is dependent the elapsed time since the start of the search for a serving cell.

7. The system as in claim 6 in the which the scan rate calculated by said scan rate generator is an exponential function with respect to the Search Time Interval, whereby the Calculated Scan Rate decreases in a nonlinear manner as the Search Time Interval increases.

8. The system as in claim 6 in which the scan rate calculated by said scan rate generator is a linear function with respect to the Search Time Interval, whereby the Calculated Scan Rate decreases uniformly as the Search Time Interval increases.

9. The system as in claim 6 wherein a First Time Interval is provided, where the First Time Interval establishes a minimum time interval, and a First Scan Rate is provided, where the First Scan Rate is the maximum scan rate, and further comprising a first comparator to compare the First Time Interval to the Search Time Interval, said first comparator having a first input to accept the Search Time Interval, a second input to accept the First Time Interval, and an output to supply a scan rate as follows:

supplying the Calculated Scan Rate when the Search Time Interval is greater than the First Time Interval; and supplying the First Scan Rate when the Search Time Interval is less than the First Time Interval, whereby the maximum scan rate is initially used to search for a serving cell.

10. The system as in claim 9 further comprising a first interval generator to store information concerning the quantity and signal strength of the beacon signals of neighboring cells supplied by the Beacon Data Signal, creating a neighborhood record, said first interval generator retrieving the neighborhood record when a serving cell is to be selected, and increasing the First Time Interval in response to a large number of neighboring cells having high strength beacon signals, said first interval generator having an input to accept the Beacon Data Signal, and an output to supply the First Time Interval, whereby the maximum scan rate is maintained for a longer period of time when the recorded neighboring beacon signals are numerous and strong.

11. The system as in claim 10 wherein the neighborhood record of said first interval generator is updated at a selective interval to create a record of neighborhood updates, and in which the results of neighborhood record updates are compared, said first interval generator increasing the First Time Interval when the updates show a consistent record of a large number of neighboring cells having high strength beacon signals, whereby the maximum scan rate is maintained for a shorter period of time when the mobile station shows a continuing degradation in the strength of neighboring beacon signals.

12. The system as in claim 6 wherein a Second Time Interval is provided, where the Second Time Interval establishes a maximum time interval, and a Second Scan Rate is provided, where the Second Scan Rate is the minimum scan rate, and further comprising a second comparator to compare the Second Time Interval to the Search Time Interval, said second comparator having a first input to accept the Search Time Interval, a second input to accept the Second Time Interval, and an output supplying a scan rate as follows:

supplying the Calculated Scan Rate when the Search Time Interval is less than the Second Time Interval; and supplying the Second Scan Rate when the Search Time Interval is greater than the Second Time Interval, whereby the scan rate is ultimately set to the minimum rate to save battery power.

13. The system as in claim 12 further comprising a second interval generator to decrease the Second Time Interval as the battery power decreases, said second interval generator having an input to accept a measurement of the battery power, and an output to supply the Second Time Interval, whereby the mobile station switches to the minimum scan rate sooner when the battery power is low.

14. The system as in claim 12 further comprising a second interval generator to decrease the Second Scan Rate as the battery power decreases, said second interval generator having an input to accept a measurement of battery power and an output to supply the Second Scan Rate, whereby the mobile station slows the Second Scan Rate when the battery power is low.

15. In a wireless communications system servicing a geographical area and including a plurality of intercommunicating cells, with each cell having a beacon signal, the communications system also including a plurality of mobile stations to send and receive user information, each mobile station selecting a serving cell by scanning a predetermined set of beacon signals, a method for conserving battery power in a mobile station when the mobile station is searching for a serving cell, the method comprising the steps of:

a) measuring an elapsed time when a serving cell is to be selected, creating a Search Time Interval;

b) using the Search Time Interval to calculate a Calculated Scan Rate which varies inversely with the Search Time Interval, such that the Calculated Scan Rate decreases as the Search Time Interval increases;

c) searching the set of beacon signals at the scan rate calculated in step b), whereby the scan rate decreases when the search for a serving cell is unsuccessful; and d) determining if a cell is selected as a serving cell, and if a serving cell is not found, then remeasuring the Search Time Interval in step a), whereby the calculated scan rate is changed, and the search to select a serving cell is repeated at the new rate.

16. The method as in claim 15 wherein a First Time Interval is provided, where the First Time Interval establishes a minimum time interval, and a First Scan Rate is provided, where the First Scan Rate is the maximum scan rate, and the search for beacon signals in step c) is responsive to an additional step, performed before step c), of comparing the Search Time Interval measured in step a) and the First Time Interval to select a scan rate as follows:

i) using the Calculated Scan Rate when the Search Time Interval is greater than the First Time Interval; and ii) using the First Scan Rate when the Search Time Interval is less than the First Time Interval, whereby the scan rate is initially repeated at the maximum rate.

17. The method as in claim 15 wherein a Second Time Interval is provided, where the Second Time Interval establishes a maximum time interval, and a Second Scan Rate is provided, where the Second Scan Rate is the minimum scan rate, and the search for beacon signals in step c) is responsive to an additional step, performed before step c), of comparing the Search Time Interval measured in step a) and the Second Time Interval to select a scan rate as follows:

i) using the Calculated Scan Rate when the Search Time Interval is less than the Second Time Interval; and ii) using the Second Scan Rate when the Search Time Interval is greater than the Second Time Interval, whereby the scan rate is ultimately repeated at the minimum rate to save battery power.

* * * * *

UNITED STATES PATENT AND TRADEMARK OFFICE
CERTIFICATE OF CORRECTION

PATENT NO. : 5,794,146
DATED : August 11, 1998
INVENTOR(S) : Peter J. Sevcik and Jeffrey S. Vigil It is certified that error appears in the above-identified patent and that said Letters Patent is hereby corrected as shown below:

| | | |
|---|---|---|
| Title page, first col., last line | "cCellular" | should be --Cellular--. |
| Title page, second col., Abstract, first line | "providing" | should be --provided--. |
| Title page, second col., Abstract, 2$^{nd}$-last line | "is" | should be --in--. |
| col. 3, line 58 | "if" | should be --is--. | col.13, line 47-52

(ETV * -(ET-FTI)/(STI-FTI)
TNS= e* (1/SSR-1)/FSR)+1/FSR should be $$TNS = e^{ETV * (-1 + (ET - FTI)/(STI - FTI))} * (1/SSR - 1/FSR) + 1/FSR$$

UNITED STATES PATENT AND TRADEMARK OFFICE
CERTIFICATE OF CORRECTION

PATENT NO. : 5,794,146
DATED : August 11, 1998
INVENTOR(S) : Peter J. Sevcik and Jeffrey S. Vigil It is certified that error appears in the above-identified patent and that said Letters Patent is hereby corrected as shown below:

col. 14, Table 3, third line          "expoential" should be --exponential--.

Signed and Sealed this

Sixteenth Day of March, 1999

Attest:

Q. TODD DICKINSON

Attesting Officer          Acting Commissioner of Patents and Trademarks